United States Patent
Li et al.

(10) Patent No.: US 10,862,991 B2
(45) Date of Patent: Dec. 8, 2020

(54) SYSTEM AND METHOD FOR CONDITIONAL CALL PATH MONITORING IN A DISTRIBUTED TRANSACTIONAL MIDDLEWARE ENVIRONMENT

(71) Applicant: Oracle International Corporation, Redwood Shores, CA (US)

(72) Inventors: Jared Li, Beijing (CN); Sheng Zhu, Beijing (CN); Chris Guo, Beijing (CN); Bingbing Luan, Beijing (CN); Xiaoou Sun, Beijing (CN); Todd Little, Palatine, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 35 days.

(21) Appl. No.: 15/975,557

(22) Filed: May 9, 2018

(65) Prior Publication Data
US 2019/0089803 A1    Mar. 21, 2019

Related U.S. Application Data

(63) Continuation of application No. PCT/CN2017/071091, filed on Jan. 13, 2017.

(51) Int. Cl.
*H04L 29/08* (2006.01)
*G06F 9/46* (2006.01)
(Continued)

(52) U.S. Cl.
CPC ...... *H04L 67/2842* (2013.01); *G06F 9/44526* (2013.01); *G06F 9/466* (2013.01);
(Continued)

(58) Field of Classification Search
CPC ... H04L 67/2842; H04L 67/10; G06F 9/5005; G06F 9/44526; G06F 9/466; G06F 8/60
See application file for complete search history.

(56) References Cited

U.S. PATENT DOCUMENTS

| 6,272,515 | B1 * | 8/2001 | Fouquet | G06F 9/466 |
| | | | | 718/101 |
| 6,754,181 | B1 * | 6/2004 | Elliott | H04L 12/66 |
| | | | | 370/252 |

(Continued)

FOREIGN PATENT DOCUMENTS

| CN | 103827829 | 5/2014 |
| CN | 105760219 | 7/2016 |

OTHER PUBLICATIONS

International Search Report and the Written Opinion of the International Searching Authority dated May 12, 2017 for PCT/CN2017/071091, 11 pages.

(Continued)

*Primary Examiner* — Jimmy H Tran
(74) *Attorney, Agent, or Firm* — Tucker Ellis LLP (57) ABSTRACT

In accordance with an embodiment, described herein is a system and method for conditional call path monitoring in a distributed transactional middleware environment. A cache can be provided in local memory, for use by an agent in the reporting and aggregation of call path metrics. When the agent collects such metrics, it does not report them immediately to a system and application monitor (SAM) manager (e.g., Tuxedo System and Application Monitor, TSAM), but instead stores them in the cache, indexed by correlation ID (identifier). When a predefined condition is met at a participating node, that node propagates a corresponding correlation ID to other participating nodes, via the SAM manager. The other participating nodes can then search for the cor- (Continued)

relation ID in the cache, and report to the SAM manager metrics of call paths which meet the condition.

19 Claims, 3 Drawing Sheets

(51) Int. Cl.
*G06F 9/445* (2018.01)
*G06F 9/50* (2006.01)
*G06F 8/60* (2018.01)

(52) U.S. Cl.
CPC ............ *G06F 9/5005* (2013.01); *H04L 67/10* (2013.01); *G06F 8/60* (2013.01)

(56) References Cited

U.S. PATENT DOCUMENTS

| | | | | |
|---|---|---|---|---|
| 7,145,898 B1* | 12/2006 | Elliott | ............... | H04L 12/66 |
| | | | | 370/352 |
| 7,673,181 B1* | 3/2010 | Lindo | ............... | G06F 11/3612 |
| | | | | 714/38.13 |
| 7,917,911 B2* | 3/2011 | Bansal | ............... | G06F 11/3447 |
| | | | | 719/313 |
| 8,463,894 B2 | 6/2013 | Chen | | |
| 8,935,772 B2* | 1/2015 | Devine | ............... | G06F 11/0781 |
| | | | | 726/11 |
| 9,817,860 B2* | 11/2017 | Gkantsidis | ............... | G06F 16/24 |
| 2002/0173997 A1* | 11/2002 | Menard | ............... | G06Q 30/06 |
| | | | | 709/223 |
| 2003/0023715 A1* | 1/2003 | Reiner | ............... | G06F 11/32 |
| | | | | 709/224 |
| 2003/0056199 A1* | 3/2003 | Li | ............... | G06F 11/323 |
| | | | | 717/127 |
| 2003/0110312 A1* | 6/2003 | Gunduc | ............... | G06F 9/44526 |
| | | | | 719/328 |
| 2004/0068560 A1* | 4/2004 | Oulu | ............... | G06F 11/3495 |
| | | | | 709/224 |
| 2004/0068728 A1* | 4/2004 | Blevins | ............... | G06F 9/546 |
| | | | | 718/100 |
| 2004/0187127 A1* | 9/2004 | Gondi | ............... | G06F 9/466 |
| | | | | 718/100 |
| 2005/0055399 A1* | 3/2005 | Savchuk | ............... | H04L 63/0245 |
| | | | | 709/203 |
| 2007/0263541 A1* | 11/2007 | Cobb | ............... | H04L 41/5003 |
| | | | | 370/235 |
| 2008/0134205 A1* | 6/2008 | Bansal | ............... | G06F 11/3447 |
| | | | | 719/315 |
| 2008/0201465 A1* | 8/2008 | Jones | ............... | H04L 29/06 |
| | | | | 709/224 |
| 2008/0307088 A1* | 12/2008 | Chen | ............... | G06F 11/3495 |
| | | | | 709/224 |
| 2009/0109959 A1* | 4/2009 | Elliott | ............... | H04L 12/1403 |
| | | | | 370/352 |
| 2013/0086199 A1* | 4/2013 | Frank | ............... | G06F 9/546 |
| | | | | 709/213 |
| 2013/0111576 A1* | 5/2013 | Devine | ............... | H04L 63/0272 |
| | | | | 726/11 |
| 2013/0246368 A1* | 9/2013 | Parkinson | ............... | G06F 16/21 |
| | | | | 707/674 |
| 2014/0006618 A1* | 1/2014 | Pitts | ............... | G06F 12/0804 |
| | | | | 709/225 |
| 2014/0149486 A1* | 5/2014 | Ebright | ............... | G06F 11/3495 |
| | | | | 709/202 |
| 2017/0118284 A1* | 4/2017 | Chen | ............... | H04L 67/34 |
| 2017/0142450 A1* | 5/2017 | Ghosal | ............... | H04N 21/2187 |
| 2017/0280307 A1* | 9/2017 | Hosie | ............... | H04W 4/16 |

OTHER PUBLICATIONS

European Patent Office, The Hague, Extended European Search Report, Supplementary European Search Report dated Jun. 17, 2020 for European Application No. 17891363.8 , 8 pages.

* cited by examiner

Method for conditional call path monitoring in a distributed transactional middleware environment 300

Providing, at one or more computers including at least one microprocessor, a distributed transactional middleware environment includes a plurality of nodes, a plurality of agents associated with the plurality of nodes, and a cache for use in at least one of reporting or aggregation of call path metrics. — 310

Providing a system and application monitor manager that enables conditional call path monitoring. — 320

Collecting the call path metrics, and storing the call path metrics in the cache, indexed by correlation IDs, using an agent. — 330

Upon a predefined condition being met at a participating node, the participate node propagates a corresponding correlation ID to other participating nodes, via the system and application monitor manager. — 340

The other participating nodes search for the correlation ID in the cache, and report, to the system and application monitor manager, metrics of call paths which meet the condition. — 350

*FIGURE 3*

SYSTEM AND METHOD FOR CONDITIONAL CALL PATH MONITORING IN A DISTRIBUTED TRANSACTIONAL MIDDLEWARE ENVIRONMENT

CLAIM OF PRIORITY

This application claims the benefit of priority to International Application titled "SYSTEM AND METHOD FOR CONDITIONAL CALL PATH MONITORING IN A DISTRIBUTED TRANSACTIONAL MIDDLEWARE ENVIRONMENT", International Application No. PCT/CN2017/071091, filed Jan. 13, 2017, which application is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to computing environments, including transactional middleware environments, and are particularly related to conditional call path monitoring in a distributed transactional middleware environment.

BACKGROUND

In a distributed transactional middleware or other computing environment, the execution of a transaction often involves multiple processing nodes, such that the execution path (call path) of the transaction can be complicated, requiring computationally expensive reporting and aggregation of call path metrics. These are some examples of the types of environments in which embodiments of the invention can be used.

SUMMARY

In accordance with an embodiment, described herein is a system and method for conditional call path monitoring in a distributed transactional middleware environment. A cache can be provided in local memory, for use by an agent in the reporting and aggregation of call path metrics. When the agent collects such metrics, it does not report them immediately to a system and application monitor (SAM) manager (e.g., Tuxedo System and Application Monitor, TSAM), but instead stores them in the cache, indexed by correlation ID (identifier). When a predefined condition is met at a participating node, that node propagates a corresponding correlation ID to other participating nodes, via the SAM manager. The other participating nodes can then search for the correlation ID in the cache, and report to the SAM manager metrics of call paths which meet the condition.

DETAILED DESCRIPTION

As described above, in a distributed transactional middleware environment, the execution of a transaction often involves multiple processing nodes, such that the execution path (call path) of the transaction can be complicated, requiring computationally expensive reporting and aggregation of call path metrics.

One approach to analyzing the execution of a complicated transaction is to deploy an agent on each node, to collect and report transaction execution details to a centralized manager, which then aggregates the information reported by participating agents, and generates an overall call path.

However, in many situations, a system administrator may only be interested in call paths that are abnormal, and such expensive call path reporting and calculation may not be required when the system is running fine.

In accordance with an embodiment, described herein is a system and method for conditional call path monitoring in a distributed transactional middleware environment. A cache can be provided in local memory, for use by an agent in the reporting and aggregation of call path metrics. When the agent collects such metrics, it does not report them immediately to a system and application monitor (SAM) manager (e.g., Tuxedo System and Application Monitor, TSAM), but instead stores them in the cache, indexed by correlation ID (identifier). When a predefined condition is met at a participating node, that node propagates a corresponding correlation ID to other participating nodes, via the SAM manager. The other participating nodes can then search for the correlation ID in the cache, and report to the SAM manager metrics of call paths which meet the condition.

Transactional Middleware Environment

Transactional middleware environments, for example computing environments such as Oracle Tuxedo environments, are widely used by enterprises to develop and use mission-critical applications, including acting as an infrastructure layer in distributed computing environments.

In accordance with an embodiment, a transactional middleware environment can use a system and application monitor (SAM, examples of which include the Tuxedo System and Application Monitor, TSAM, TSAM Plus), or a similar component or functionality, to provide monitoring and reporting for the system and applications, including, for example, the monitoring of real-time performance bottlenecks and business data fluctuations.

In accordance with an embodiment, a SAM agent enables collection of application performance metrics, such as, for example, call path, transactions, services, and system servers.

In accordance with an embodiment, a SAM manager provides an interface, such as a graphical user interface, that correlates and aggregates performance metrics collected from one or more domains, and displays this information in real time.

Figure 1:
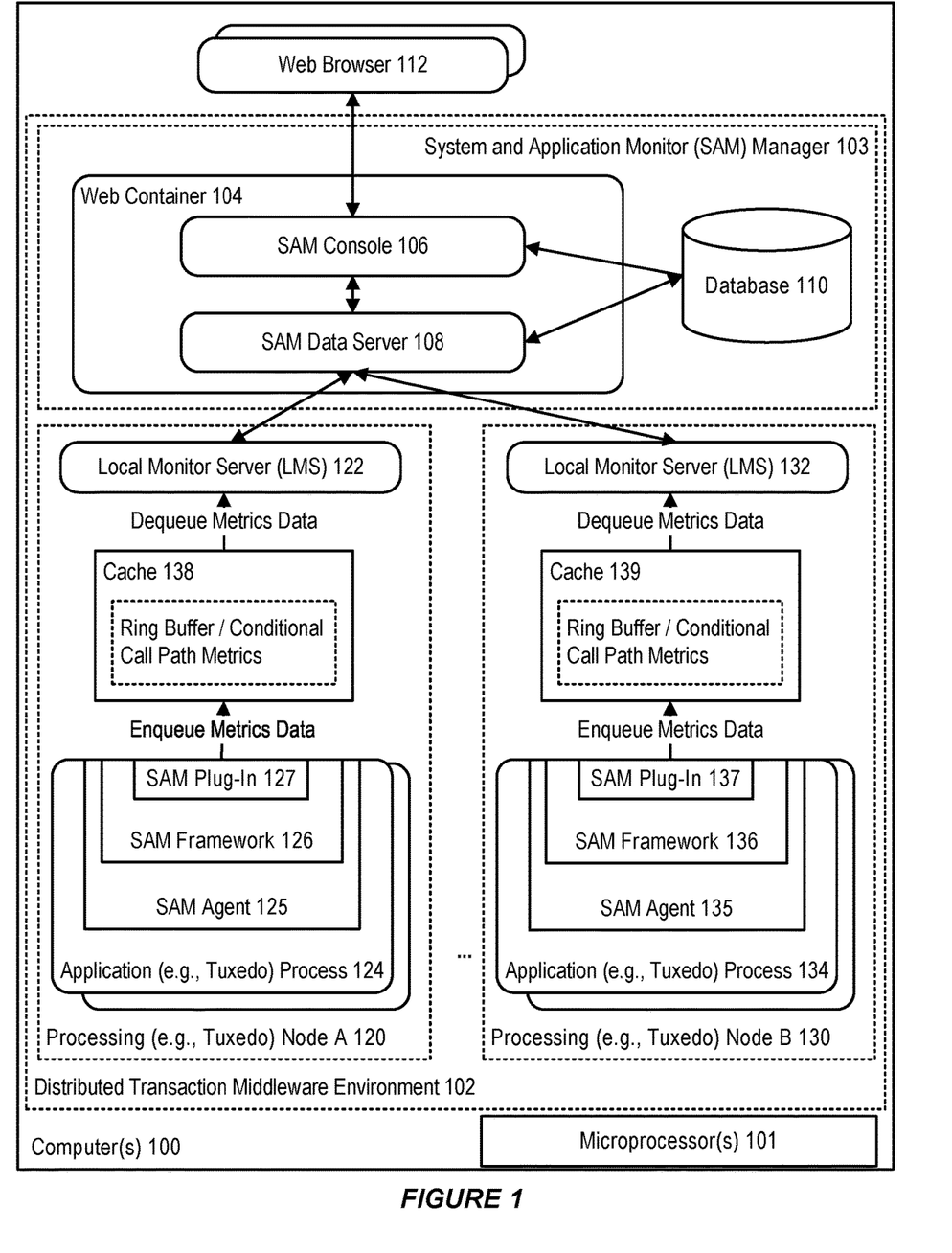
FIG. 1 illustrates a distributed transactional middleware environment which enables conditional call path monitoring, in accordance with an embodiment.

FIG. 1 illustrates a distributed transactional middleware environment which enables conditional call path monitoring, in accordance with an embodiment.

As illustrated in FIG. 1, in accordance with an embodiment, a system can comprise one or more computer(s) 100 including at least one microprocessor(s) 101, and a distributed transactional middleware environment 102 provided thereon.

In accordance with an embodiment, a SAM manager can be provided as a web container 104 that enables a SAM console 106, and SAM data server 108, and utilizes a database 110 for storage of data.

In accordance with an embodiment, each of a plurality of processing nodes (e.g., Tuxedo nodes) A 120 and B 130, can include a local monitor server (LMS) 122, 132, and one or more application (e.g., Tuxedo) processes 124, 134, each of which is associated with a SAM agent 125, 135, having a SAM framework 126, 136, and SAM plug-in 127, 137.

In accordance with an embodiment, a cache 138, 139 enables use of, for example, a ring buffer, for storage of conditional call path metrics data.

System and Application Monitor (SAM) Agent

In accordance with an embodiment, the SAM agent handles back-end logic, works in conjunction with the SAM manager, and includes the following sub-components:

SAM framework: a data collection engine operating as a layer between, e.g., a Tuxedo infrastructure and other SAM components, and responsible for run time metrics collection, alert evaluation, and monitoring policy enforcement.

SAM plug-in: an extensible mechanism invoked by the SAM framework. The SAM agent provides plug-ins to send data to a LMS, and then to the SAM manager.

Local monitor server (LMS): a server process, e.g., a Tuxedo system server, that enables SAM plug-ins to send data to the LMS, which then passes the data to the SAM manager using, e.g., HTTP protocol.

System and Application Monitor (SAM) Manager

In accordance with an embodiment, the SAM manager includes the following components:

SAM data server: the data server is responsible for accepting data from an LMS and storing it to a database; accepting requests from a presentation layer; and communicating with the LMS for configuration instructions.

SAM console: a presentation layer which can be accessed via a compatible Web browser.

In accordance with an embodiment, the SAM manager runs in a Java application server, for example a WebLogic Server instance, and can use a relational database to store information such as, for example: performance metrics collected by the SAM agent; process (e.g., Tuxedo) component information; user account information; and alerts and events.

Call Path Monitoring

Transactional middleware environments are often used by a client program or application that calls a service to perform a business computing logic scenario, wherein the service implementation is completely transparent to the caller. This type of middleware transparency provides benefits for development, deployment, and system administration. However, from a monitoring perspective, it may be difficult for an administrator to determine what happens behind the scene, which can be addressed using call path monitoring.

In accordance with an embodiment, an application call triggers a set of service invocations. The involved services constitute a tree (call path tree), which defines factors such as:

The type of services that are involved to perform the initial service request.

The service invocation depth (the depth of the call path tree).

The service invocation sequence, for example, client A calls SVC1. SVC1 calls SVC2 and SVC3.

Call transportation—the edge (how information is sent and received) of a call path tree represents the transportation information from caller to service provider, for example, an IPC queue, or BRIDGE connection.

Call path metrics—which are available during the message propagation, such as the message size, execution status, transaction and CPU consumption.

In accordance with an embodiment, a monitoring initiator is a process that initiates tracking a call path tree. The process can be, for example, a Tuxedo client, application server, client proxy server (WSH/JSH), a Tuxedo domain gateway server or web services proxy server. A typical scenario is when a tpcall/tpacall/tpconnect is invoked by the monitoring initiator, and call path monitoring begins.

Service Monitoring

In accordance with an embodiment, service monitoring can be used, e.g., to determine a Tuxedo service execution status.

System Server Monitoring

In accordance with an embodiment, examples of system servers can include, e.g., BRIDGE: connects multiple Tuxedo machines within a Tuxedo domain; GWTDOMAIN: connects one Tuxedo domain with others; and GWWS: a web services gateway.

Transaction Monitoring

In accordance with an embodiment, transaction monitoring can be used, e.g., to track XA calls triggered in a transaction.

Policy Monitoring

In accordance with an embodiment, policy monitoring enables policy monitoring settings to be used to collect the exact metrics needed with minimum application performance impact.

Performance Metrics

In accordance with an embodiment, a correlation ID is a unique identifier that represents a call path tree. It can be generated by a monitoring initiator plug-in, and use the following format:

DOMAINID:MASTERHOSTNAME:IPCKEY LMID PROCESSNAME PID TID COUNTER TIMESTAMP

An example of a Correlation ID is shown below, wherein the monitored call is started by the program "bankclient" with process ID 8089 and thread ID 1 on machine "SITE1" on Tuxedo domain "TUXDOM1". The master is "bjsol18" and IPCKEY in TUXCONFIG is "72854".

TUXDOM1:bjsol18:72854 SITE1 bankclient 8089 1 99 1259309025

In accordance with an embodiment, examples of metrics include: Service Name: the name of a Tuxedo service.

Location: a set of metrics to identify the process who sends out the performance metrics, for example, information about domain, machine, group and process name.

IPC Queue Length: the message number in an IPC queue.

IPC Queue ID: a Tuxedo identifier of an IPC queue.

Execution Time: the time used in a Tuxedo service or XA call execution in milliseconds.

Wait Time: the time used of a message in the transportation stage.

CPU Time: the CPU time consumed by the service request processing.

Message Size: the Tuxedo message size.

Execution Status: a tpreturn service return code, defined by the Tuxedo ATMI interface.

Call Flags: the flags passed to tpcall/tpacall in the Tuxedo ATMI interface.

Call Type: tpcall, tpacall, or tpforward.

Elapse Time: the time elapsed time a call is monitored.

GTRID: a Tuxedo global transaction ID.

Pending Message Number: the number of messages which are delivered to the Tuxedo network layer and waiting for being sent.

Message Throughput: the total message number and volume accumulated in, e.g., system server monitoring intervals.

Waiting Reply Message Number: the number of requests in GWTDOMAIN awaiting a reply from the remote domain.

XA Code: the XA call return code in transaction monitoring.

XA Name: the XA call name.

GWWS Metrics: a set of metrics used to measure GWWS throughput, including: Inbound Message Throughput; Inbound Message Processing Time; Outbound Message Throughput; Outbound Message Processing Time;

Conditional Call Path Monitoring

As described above, from a system or application monitoring perspective, it may be difficult for an administrator to determine what happens behind the scene, which can be addressed using call path monitoring.

In accordance with an embodiment, described herein is a system and method for conditional call path monitoring in a distributed transactional middleware environment. A cache can be provided in local memory, for use by an agent in the reporting and aggregation of call path metrics. When the agent collects such metrics, it does not report them immediately to a SAM manager, but instead stores them in the cache, indexed by correlation ID (identifier). When a predefined condition is met at a participating node, that node propagates a corresponding correlation ID to other participating nodes, via the SAM manager. The other participating nodes can then search for the correlation ID in the cache, and report to the SAM manager metrics of call paths which meet the condition.

Plug-in Support for Conditional Call Path Monitoring

In accordance with an embodiment, a shared memory ring buffer can be provided as a data structure to store conditional call path segments. The SAM plug-in can put the conditional call path segments to this ring buffer.

In accordance with an embodiment, a field ConditionFilter (the definition of the condition) can used, for example by adding it to a Tuxedo typed container module (META_TCM) for conditional call path metrics. The condition filter can be propagated along with the call path metrics, so that the participant of the call path can use it to evaluate the condition. The ConditionFilter field can be removed from META_TCM when the condition is met.

In accordance with an embodiment, a condition can be evaluated at different hook points in the SAM plug-in.

In accordance with an embodiment, regardless of whether the call path condition is met or not, the conditional call path segment can be reported to the conditional call path ring buffer. If the condition is met, additional information is added to the call path segment, for example: matched flag: indicate this is a condition met call path segment; prevN/nextN: indicate the previous/next N call paths should be reported; cross-machine flag: added if the metrics is reported by BRIDGE or GWTDOMAIN.

LMS Support for Conditional Call Path Monitoring

In accordance with an embodiment, the local monitor server (LMS) attaches to a ring buffer (Ring buffer) for the conditional call path metrics, and reads the call path metrics from it periodically.

In accordance with an embodiment, a conditional call path index table (Index table) facilitates the search for call path segments in the ring buffer for a certain correlation ID. An element of the index table includes the following fields: corr_id: the correlation ID of the call path segment; address: the address of the segment in the ring buffer. Both corr_id and address are indexed and sorted. The index table can be provided as an internal data structure within the local monitor server.

In accordance with an embodiment, a correlation ID can be set for a condition met call path (Matched Corr_id set). A data structure stores the correlation IDs for the call paths which met the condition. The element includes the following fields: corr_id: the correlation id which met the condition; prevN/nextN: the previous/next N call paths should be reported as well. Is_propagated: whether this corr_id is propagated from other node via the SAM manager; time_stamp: the time when the element is added. This can be provided as an internal data structure within the local monitor server.

In accordance with an embodiment, a list of call path segment to be reported to SAM manager (Output Segment list) can be provided as an internal data structure within the local monitor server.

Conditional Call Path Monitoring Interface

In accordance with an embodiment, to enable conditional call path monitoring, one or more interfaces can be provided, for example:

retrieveData1: get N segments from the read pointer of the ring buffer.

retrieveData2: get a segment at an address from the ring buffer.

cpi_put: put a (corr_id, segment_address) pair to the index table, optionally purge the invalid elements in the table.

cpi_get: get a list of addresses for all the segments of a corr_id from the index table, optionally including the segments for the previous/next N corr_id.

outputSeg: put a segment to the Output segment list.

Figure 2:
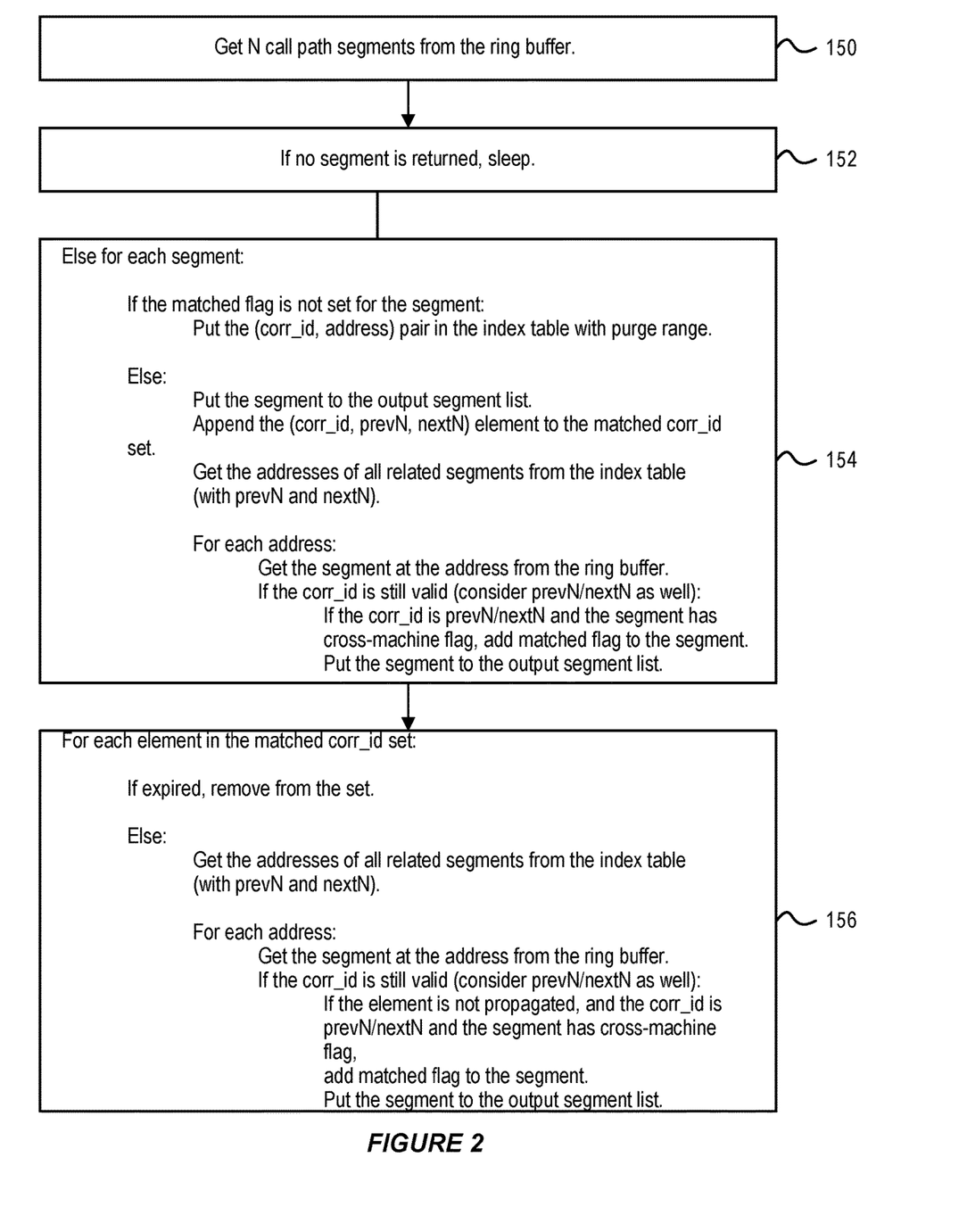
FIG. 2 illustrates a process for conditional call path monitoring, in accordance with an embodiment.

FIG. 2 illustrates a process for conditional call path monitoring, in accordance with an embodiment.

As illustrated in FIG. 2, in accordance with an embodiment, a thread is added to the local monitor server to process the conditional call path, which includes, at step 150, periodically:

Call retrieveData1 to get N call path segments from the ring buffer.

At step 152, the process continues, in accordance with an embodiment:

If no segment is returned:
  Sleep X ms.

At step 154, the process continues, in accordance with an embodiment:

Else for each segment:
  If the matched flag is not set for the segment:
    Call cpi_put to put the (corr_id, address) pair to the index table with purge range.
  Else:
    Call outputSeg to put the segment to the output segment list.
    Append the (corr_id, prevN, nextN) element to the matched corr_id set.
    Call cpi_get to get the addresses of all related segments from the index table (with prevN and nextN).
    For each address:
    Call retrieveData2 to get the segment at the address from the ring buffer.
    If the corr_id is still valid (consider prevN/nextN as well):
      If the corr_id is prevN/nextN and the segment has cross-machine flag:
        Add matched flag to the segment.

Call outputSeg to put the segment to the output segment list.

At step 156, the process continues, in accordance with an embodiment:

For each element in the matched corr_id set:
 If expired:
 Remove me from the set.
 Else:
 Call cpi_get to get the addresses of all related segments from the index table (with prevN and nextN).
 For each address:
 Call retrieveData2 to get the segment at the address from the ring buffer.
 If the corr_id is still valid (consider prevN/nextN as well):
 If the element is not propagated and the corr_id is prevN/nextN and the segment has cross-machine flag:
 Add matched flag to the segment.
 Call outputSeg to put the segment to the output segment list.

The above is provided by way of example to illustrate an embodiment of a process for conditional call path monitoring. In accordance with other embodiments, other types of steps can be used In accordance with an embodiment, the system gets call path segments from the output segment list, and reports to the SAM manager. The SAM manager will then propagate the cross-machine condition met correlation ID (corr_id, prevN, nextN) to all LMS. When receiving the propagated (corr_id, prevN, nextN), the local monitor server adds it to the matched corr_id set.

In accordance with an embodiment, the condition met call path segment includes various fields (matched flag, prevN, nextN, cross-machine flag). When the SAM manager receives a cross-machine condition met call path segment, it propagates the correlation ID (corr_id, prevN, nextN) to all local monitor servers which connect to the current SAM manager data server.

Figure 3:
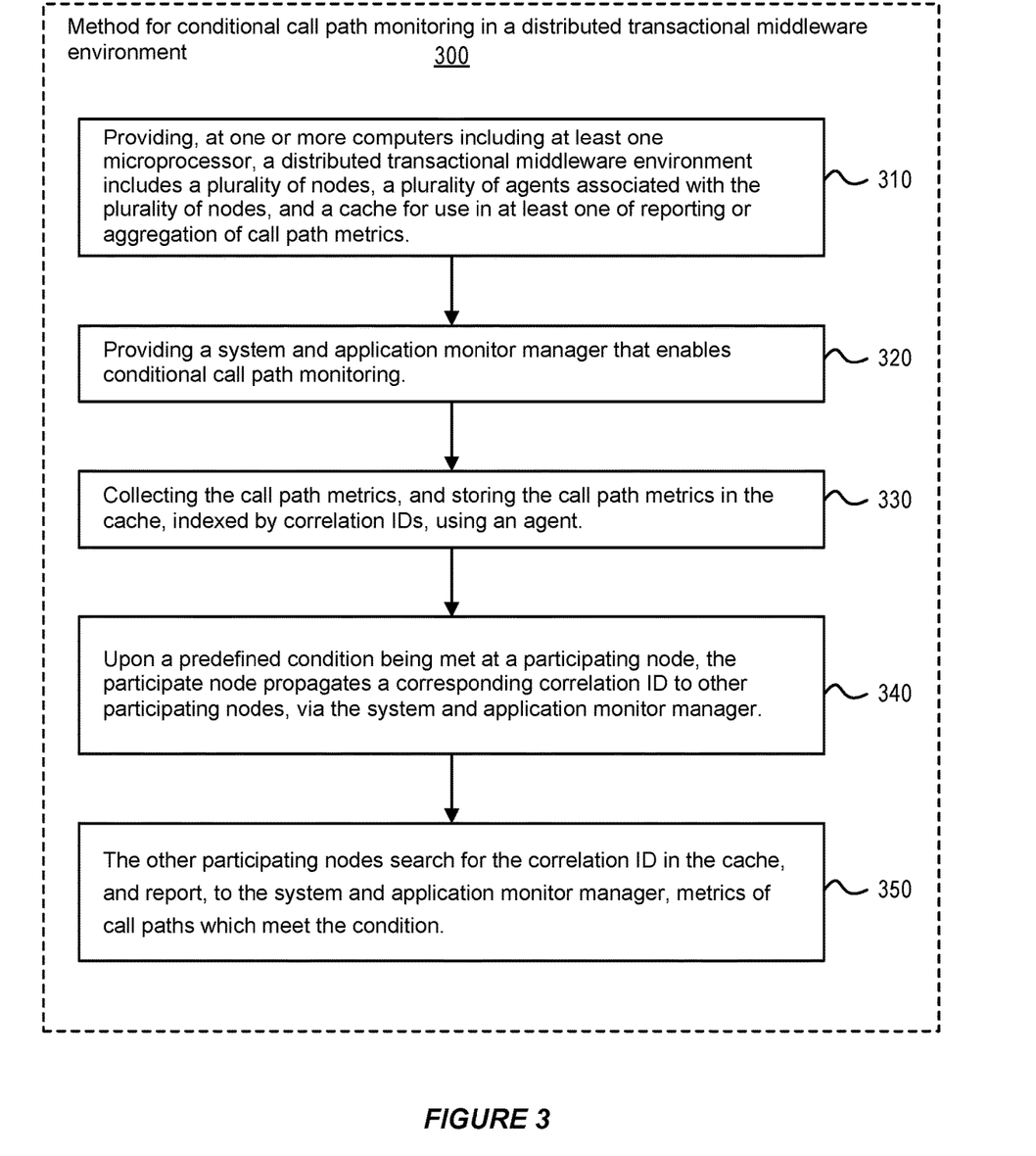
FIG. 3 illustrates a process for conditional call path monitoring in a distributed transactional middleware environment, in accordance with an embodiment.

FIG. 3 illustrates a method 300 for conditional call path monitoring in a distributed transactional middleware environment, in accordance with an embodiment. As shown in FIG. 3, step 310 of the method includes providing a distributed transactional middleware environment at one or more computers, wherein the distributed transactional middleware environment includes a plurality of nodes, a plurality of agents associated with the plurality of nodes, and a cache for use in at least one of reporting or aggregation of call path metrics. Step 320 of the method includes providing a system and application monitor manager that enables conditional call path monitoring. Step 330 of the method includes using an agent to collect the call path metrics, and store the call path metrics in the cache, indexed by correlation ID. Step 340 of the method includes, upon a predefined condition being met at a participating node, the participate node propagating a corresponding correlation ID to other participating nodes, via the system and application monitor manager. Step 350 of the method includes the other participating nodes searching for the correlation ID in the cache, and reporting, to the system and application monitor manager, metrics of call paths which meet the condition. In an embodiment, the distributed transactional middleware environment is a Tuxedo environment. In an embodiment, the system and application monitor manager is one of a Tuxedo System and Application Monitor (TSAM) component, or Tuxedo System and Application Monitor Plus (TSAM Plus) component. In an embodiment, the method of FIG. 3 is implemented in a system including a distributed transactional middleware environment provided on one or more computers including at least one microprocessor. In an embodiment, the method of FIG. 3 is implement using instructions stored on a non-transitory computer readable storage medium.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A method for conditional call path monitoring in a distributed transactional middleware environment which includes a plurality of nodes operating on a plurality of computers each having a microprocessor and memory, the method comprising:
 providing a system and application monitor manager that enables conditional call path monitoring;
 providing an agent on each of the plurality of nodes;
 providing a local cache on each of the plurality of nodes, said local cache stored in the memory of the computer on which said each of the plurality of nodes operates;
 collecting call path metrics using the agent on each of the plurality of nodes, and storing the collected call path metrics, indexed by correlation IDs, in the local cache in the memory of the computer on which said each of the each plurality of nodes operates;
 in response to a predefined condition being met at a particular node of the plurality of nodes with respect to a particular correlation ID, propagating the particular correlation ID from the agent of the particular node to each other agent of the plurality of nodes via the system and application monitor manager;

searching, with said particular agent and said each other agent of the plurality of nodes, the corresponding local cache for call path metrics indexed by said particular correlation ID; and transmitting, to said system and application monitor manager, from said particular agent and said each other agent of the plurality of nodes, all call path metrics found in the corresponding local cache and indexed by said particular correlation ID; and whereby said call path metrics found in each local cache of each of the plurality of nodes and indexed by said particular correlation ID are transmitted to said system and application monitor manager in response to said predefined condition being met at the particular node of the plurality of nodes.

2. The method of claim 1, wherein:

transmitting, to said system and application monitor manager, from said particular agent and said each other agent of the plurality of nodes, all call path metrics found in the corresponding local cache and indexed by said particular correlation ID comprises adding next segment and previous segment to such call path metrics prior to transmitting to said system and application monitor manager.

3. The method of claim 1, wherein the distributed transactional middleware environment is a Tuxedo environment.

4. The method of claim 3, wherein the system and application monitor manager is one of a Tuxedo System and Application Monitor (TSAM) component, or Tuxedo System and Application Monitor Plus (TSAM Plus) component.

5. The method of claim 1, wherein the corresponding correlation ID is a unique identifier that represents a call path tree, and that is generated by a monitoring initiator plug-in.

6. The method of claim 1, wherein the call path metrics include one or more of a service name, a process that sends the call path metrics, an IPC queue length, an execution time, a wait time, a CUP time, a message size, and an execution status.

7. The method of claim 1, wherein the predefined condition is propagated along with the call path metrics, for use by one or more of the other participating nodes to evaluate the predefined condition.

8. The method of claim 1, wherein providing a local cache on each of the plurality of nodes comprises allocating a ring buffer in the memory of the computer on which said each of the plurality of nodes operates.

9. The method of claim 1, further comprising purging elements not matching the particular correlation ID.

10. A system for conditional call path monitoring in a distributed transactional middleware environment, the system comprising:

a plurality of nodes operating on a plurality of computers each having a microprocessor and memory a system and application monitor manager that enables conditional call path monitoring;

an agent on each of the plurality of nodes;

a local cache on each of the plurality of nodes, said local cache stored in the memory of the computer on which said each of the plurality of nodes operates; and wherein the agent on each of the plurality of nodes is configured to collect call path metrics and storing the collected call path metrics, indexed by correlation IDs, in the local cache in the memory of the computer on which said each of the each plurality of nodes operates, in response to a predefined condition being met at a particular node of the plurality of nodes with respect to a particular correlation ID, propagate the particular correlation ID from the agent of the particular node to each other agent of the plurality of nodes via the system and application monitor manager, search, with said particular agent and said each other agent of the plurality of nodes, the corresponding local cache for call path metrics indexed by said particular correlation ID, and transmit, to said system and application monitor manager, from said particular agent and said each other agent of the plurality of nodes, all call path metrics found in the corresponding local cache and indexed by said particular correlation ID, whereby said call path metrics found in each local cache of each of the plurality of nodes and indexed by said particular correlation ID are transmitted to said system and application monitor manager in response to said predefined condition being met at the particular node of the plurality of nodes.

11. The system of claim 10, wherein:

transmitting, to said system and application monitor manager, from said particular agent and said each other agent of the plurality of nodes, all call path metrics found in the corresponding local cache and indexed by said particular correlation ID further comprises adding next segment and previous segment to such call path metrics prior to transmitting to said system and application monitor manager.

12. The system of claim 10, wherein the distributed transactional middleware environment is a Tuxedo environment.

13. The system of claim 12, wherein the system and application monitor manager is one of a Tuxedo System and Application Monitor (TSAM) component, or Tuxedo System and Application Monitor Plus (TSAM Plus) component.

14. The system of claim 10, wherein the corresponding correlation ID is a unique identifier that represents a call path tree, and that is generated by a monitoring initiator plug-in.

15. The system of claim 10, wherein the call path metrics include one or more of a service name, a process that sends the call path metrics, an IPC queue length, an execution time, a wait time, a CUP time, a message size, and an execution status.

16. The system of claim 10, wherein the predefined condition is propagated along with the call path metrics, for use by one or more of the other participating nodes to evaluate the predefined condition.

17. The system of claim 10, wherein the local cache provided on each of the plurality of nodes is a ring buffer allocated in the memory of the computer on which said each of the plurality of nodes operates.

18. The system of claim 10, where each agent if further configured to purge elements not matching the particular correlation ID.

19. A non-transitory computer-readable medium having instructions stored thereon for supporting conditional call path monitoring in a distributed transactional middleware environment which includes a plurality of nodes operating on a plurality of computers each having a microprocessor and memory, which instructions, when executed in the distributed transactional middleware environment, cause the distributed transactional middleware environment to perform steps comprising:

providing a system and application monitor manager that enables conditional call path monitoring;

providing an agent on each of the plurality of nodes;

providing a local cache on each of the plurality of nodes, said local cache stored in the memory of the computer on which said each of the plurality of nodes operates;

collecting call path metrics using the agent on each of the plurality of nodes, and storing the collected call path metrics, indexed by correlation IDs, in the local cache in the memory of the computer on which said each of the each plurality of nodes operates;

in response to a predefined condition being met at a particular node of the plurality of nodes with respect to a particular correlation ID, propagating the particular correlation ID from the agent of the particular node to each other agent of the plurality of nodes via the system and application monitor manager;

searching, with said particular agent and said each other agent of the plurality of nodes, the corresponding local cache for call path metrics indexed by said particular correlation ID; and transmitting, to said system and application monitor manager, from said particular agent and said each other agent of the plurality of nodes, all call path metrics found in the corresponding local cache and indexed by said particular correlation ID; and whereby said call path metrics found in each local cache of each of the plurality of nodes and indexed by said particular correlation ID are transmitted to said system and application monitor manager in response to said predefined condition being met at the particular node of the plurality of nodes.

\* \* \* \* \*

UNITED STATES PATENT AND TRADEMARK OFFICE
CERTIFICATE OF CORRECTION

PATENT NO. : 10,862,991 B2
APPLICATION NO. : 15/975557
DATED : December 8, 2020
INVENTOR(S) : Li et al.

It is certified that error appears in the above-identified patent and that said Letters Patent is hereby corrected as shown below:

In the Specification

In Column 1, Line 9, after "application" insert -- is a continuation of and --.

In Column 7, Line 25, delete "used" and insert -- used. --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*